(12) United States Patent
Nageshkar et al.

(10) Patent No.: US 11,027,635 B1
(45) Date of Patent: Jun. 8, 2021

(54) UPPER THORACIC SUPPORT FOR VEHICLE SEATING ASSEMBLY

(71) Applicant: Ford Global Technologies, LLC, Dearborn, MI (US)

(72) Inventors: Vishal Vinayak Nageshkar, Farmington Hills, MI (US); Christian J. Hosbach, Pittsburgh, PA (US); Sangram Tamhankar, Canton, MI (US); Patrick Maloney, Livonia, MI (US); John Wayne Jaranson, Dearborn, MI (US); Johnathan Andrew Line, Northville, MI (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/709,315

(22) Filed: Dec. 10, 2019

(51) Int. Cl.
| | |
|---|---|
| *B60N 2/66* | (2006.01) |
| *B60N 2/64* | (2006.01) |
| *B60N 2/68* | (2006.01) |
| *G01L 17/00* | (2006.01) |

(52) U.S. Cl.
CPC ............ *B60N 2/665* (2015.04); *B60N 2/646* (2013.01); *B60N 2/68* (2013.01); *G01L 17/00* (2013.01)

(58) Field of Classification Search
CPC ........ B60N 2/665; B60N 2/646; B60N 2/806; B60N 2/914
See application file for complete search history.

(56) References Cited

U.S. PATENT DOCUMENTS

| | | | |
|---|---|---|---|
| 3,348,880 A | 10/1967 | Swann | |
| 4,334,709 A | 6/1982 | Akiyama et al. | |
| 4,589,695 A | 5/1986 | Isono | |
| 4,629,248 A | 12/1986 | Mawbey | |
| 5,137,329 A * | 8/1992 | Neale | A47C 7/467 |
| | | | 297/284.6 |
| 5,280,997 A * | 1/1994 | Andres | A47C 7/467 |
| | | | 297/284.9 |
| 5,607,204 A | 3/1997 | Gryp | |
| 5,967,608 A | 10/1999 | Van Sickle | |
| 6,036,266 A | 3/2000 | Massara | |

(Continued)

FOREIGN PATENT DOCUMENTS

| | | | | |
|---|---|---|---|---|
| DE | 4013679 A1 * | 11/1990 | ........... | B60N 2/2222 |
| WO | WO-2015178359 A1 * | 11/2015 | ............. | B60N 2/665 |

*Primary Examiner* — Timothy J Brindley
(74) *Attorney, Agent, or Firm* — David Coppiellie; Price Heneveld LLP (57) ABSTRACT

A vehicle seating assembly including a seat and a seatback pivotably coupled to the seat. The seatback includes a frame, a sub-frame member, a carrier, a cushion, and an inflatable member. The sub-frame member is pivotably coupled to an occupant-facing surface of the frame by a bracket. The carrier is coupled to the frame such that the sub-frame member is positioned between the frame and the carrier. The cushion is coupled to an occupant-facing surface of the carrier. The inflatable member is positioned between the occupant-facing surface of the frame and an interior surface of the sub-frame member. The inflatable member is operable between a deflated state and an inflated state. The inflatable member initiates pivotable motion of the sub-frame member of an axis defined by the bracket.

20 Claims, 6 Drawing Sheets

(56) References Cited

U.S. PATENT DOCUMENTS

| | | | |
|---|---|---|---|
| 6,283,547 B1 * | 9/2001 | Bauer | B60N 2/914 |
| | | | 297/284.1 |
| 6,402,245 B1 | 6/2002 | Newton et al. | |
| 9,090,185 B2 | 7/2015 | McMillen et al. | |
| 9,688,170 B2 | 6/2017 | Wroblewski et al. | |
| 9,896,003 B2 * | 2/2018 | Tamura | B60N 2/914 |
| 9,981,577 B2 | 5/2018 | Zouzal et al. | |
| 10,286,818 B2 | 5/2019 | Line et al. | |
| 10,286,824 B2 | 5/2019 | Boland et al. | |
| 2002/0060485 A1 * | 5/2002 | Fischer | B60N 2/99 |
| | | | 297/284.4 |
| 2017/0036634 A1 * | 2/2017 | Ohno | B60N 2/90 |
| 2018/0009339 A1 * | 1/2018 | Durkee | B60N 2/2222 |
| 2018/0134181 A1 * | 5/2018 | Ketels | B60N 2/2222 |
| 2018/0134189 A1 * | 5/2018 | Iwasaki | B60N 2/885 |
| 2020/0121094 A1 * | 4/2020 | Chang | A47C 20/048 |

\* cited by examiner

UPPER THORACIC SUPPORT FOR VEHICLE SEATING ASSEMBLY

FIELD OF THE DISCLOSURE

The present disclosure generally relates to a vehicle seating assembly. More specifically, the present disclosure relates to an upper thoracic support for a vehicle seating assembly.

BACKGROUND OF THE INVENTION

Vehicles are typically provided with one or more vehicle seating assemblies. Consumers are increasingly looking for additional features and additional comfort options when occupying vehicles. Accordingly, additional solutions are needed that provide additional features and/or additional comfort options for vehicle seating assemblies.

SUMMARY OF THE INVENTION

According to a first aspect of the present disclosure, a vehicle seating assembly includes a seat and a seatback pivotably coupled to the seat. The seatback includes a frame, a sub-frame member, a carrier, a cushion, and an inflatable member. The sub-frame member is pivotably coupled to an occupant-facing surface of the frame by a bracket. The carrier is coupled to the frame such that the sub-frame member is positioned between the frame and the carrier. The cushion is coupled to an occupant-facing surface of the carrier. The inflatable member is positioned between the occupant-facing surface of the frame and an interior surface of the sub-frame member. The inflatable member is operable between a deflated state and an inflated state. The inflatable member initiates pivotable motion of the sub-frame member about an axis defined by the bracket.

Embodiments of the first aspect of the present disclosure can include any one or a combination of the following features:
- the carrier is pivotable about the axis defined by the bracket;
- a retention member is coupled to the bracket and an arm portion of the sub-frame member to retain the sub-frame member to the frame;
- the retention member couples the bracket and the arm portion of the sub-frame member and defines an aperture that receives a fastener that couples the carrier to the bracket such that the carrier is pivotable about the axis that is defined by the bracket;
- the sub-frame member directly contacts the occupant-facing surface of the frame when the inflatable member is in the deflated state;
- a position of the sub-frame member is adjustable independent of a rotational position of the seatback relative to the seat;
- a surface area of contact between the inflatable member and the interior surface of the sub-frame member is greater when the inflatable member is in the deflated state than the surface area of contact between the inflatable member and the interior surface of the sub-frame member when the inflatable member is in the inflated state;
- the frame of the seatback further comprises a recess defined by the frame, the inflatable member being positioned within the recess of the frame;
- the interior surface of the sub-frame member comprises a recess defined by the sub-frame member, the inflatable member being received by the recess defined by the sub-frame member such that the inflatable member is received between two recessed surfaces,
- the inflatable member comprises a plurality of inflatable members;
- the plurality of inflatable members are arranged along a vertical axis of the seatback;
- the plurality of inflatable members are arranged along the vertical axis such that the individual inflatable members that make up the plurality of inflatable members abut adjacent others of the individual inflatable members;
- a highest one of the inflatable members along the vertical axis is inflated to effect initial actuation of the sub-frame member from the stowed position;
- a lowest one of the inflatable members along the vertical axis is inflated to effect actuation of the sub-frame member from an intermediate position to the deployed position;
- a pressure gauge is fluidly coupled to the inflatable member and is monitored by a control module;
- the axis defined by the bracket is a fixed rotational axis; and
- the inflatable member, the sub-frame member, the carrier, and the cushion are positioned in an upper thoracic region of the seatback.

According to a second aspect of the present disclosure, a vehicle seating assembly includes a seatback pivotably coupled to a seat. The seatback includes a frame, a sub-frame member, a retention member, a carrier, a fastener, a cushion, and an inflatable member. The sub-frame member is pivotably coupled to an occupant-facing surface of the frame by a bracket. The bracket defines an axis about which the sub-frame member pivots. The retention member is coupled to the bracket and the sub-frame member. The retention member retains the sub-frame member to the frame. The retention member defines an aperture. The carrier is coupled to the frame such that the sub-frame member is positioned between the frame and the carrier. The carrier is pivotable about the axis defined by the bracket. The fastener is received within the aperture defined by the retention member. The fastener couples the carrier to the bracket such that the carrier is pivotable about the axis that is defined by the bracket. The cushion is coupled to an occupant-facing surface of the carrier. The inflatable member is positioned between the occupant-facing surface of the frame and an interior surface of the sub-frame member. The inflatable member is operable between a deflated state and an inflated state. The sub-frame member directly contacts the occupant-facing surface of the frame when the inflatable member is in the deflated state. The inflatable member initiates pivotable motion of the sub-frame member about the axis defined by the bracket. A surface area of contact between the inflatable member and the interior surface of the sub-frame member is greater when the inflatable member is in the deflated state than the surface area of contact between the inflatable member and the interior surface of the sub-frame member when the inflatable member is in the inflated state. The inflatable member, the sub-frame member, the carrier, and the cushion are each positioned in an upper thoracic region of the seatback.

Embodiments of the second aspect of the present disclosure can include any one or a combination of the following features:
- the frame of the seatback further includes a recess defined by the frame, the inflatable member being positioned within the recess of the frame; and the interior surface of the sub-frame member includes a recess defined by the sub-frame member, the inflatable member being received by the recess defined by the sub-frame member such that the inflatable member is received between two recessed surfaces.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
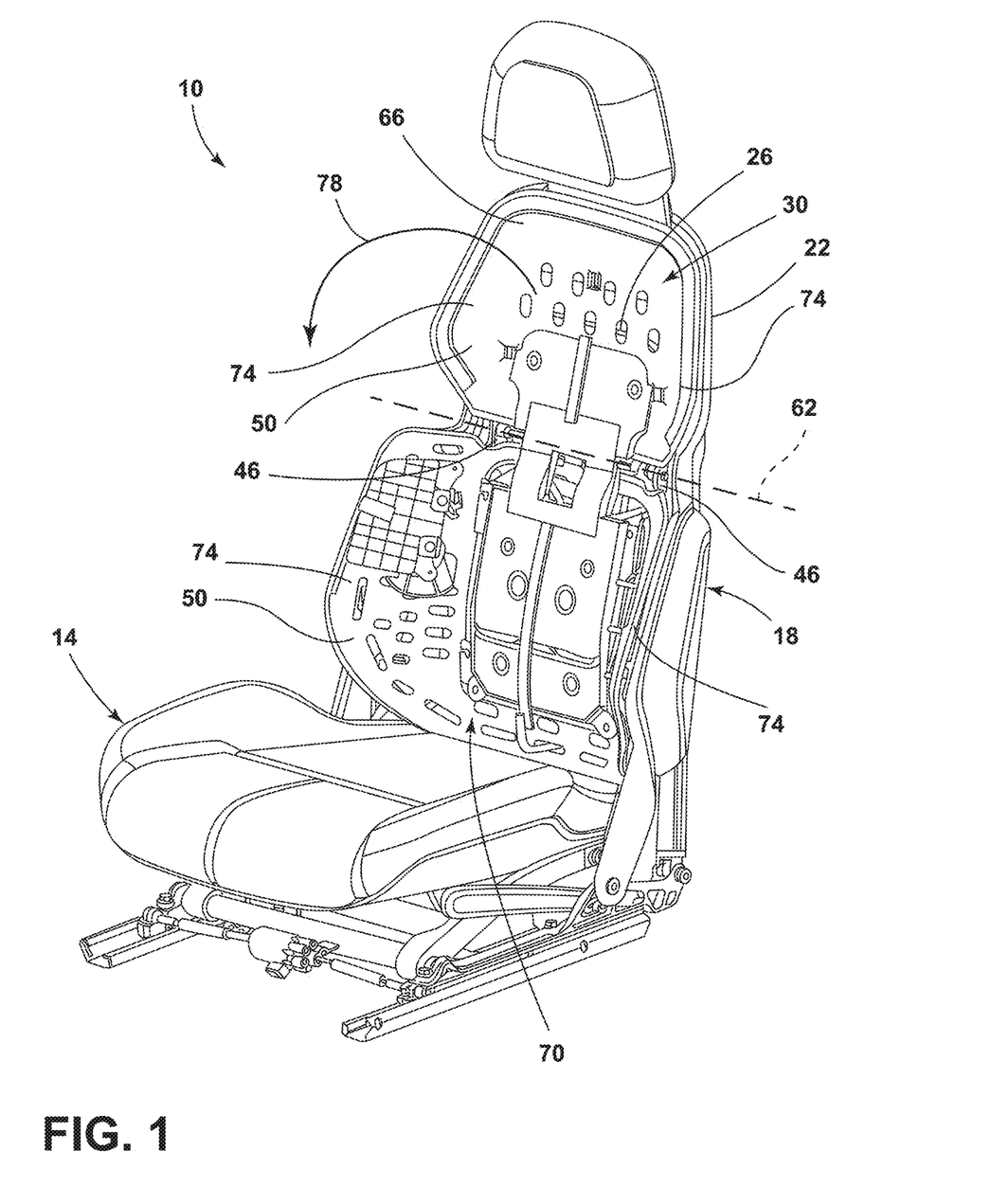
FIG. 1 is a front perspective view of a vehicle seating assembly with a cushion of a seatback removed, illustrating a carrier of the seatback of the vehicle seating assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, a vehicle seating assembly 10 includes a seat 14 and a seatback 18. The seatback 18 is pivotably coupled to the seat 14. The seatback 18 can include a frame 22, a sub-frame member 26, a carrier 30, a cushion 34, and/or an inflatable member 38. The sub-frame member 26 is pivotably coupled to an occupant-facing surface 42 of the frame 22 by a bracket 46. The carrier 30 is coupled to the frame 22 such that the sub-frame member 26 is positioned between the frame 22 and the carrier 30. The cushion 34 is coupled to an occupant-facing surface 50 of the carrier 30. The inflatable member 38 can be positioned between the occupant-facing surface 42 of the frame 22 and an interior surface 54 of the sub-frame member 26. Alternatively, in examples where the sub-frame member 26 is omitted, the inflatable member 38 can be positioned between the occupant-facing surface 42 of the frame 22 and an interior surface 58 of the carrier 30. The inflatable member 38 is operable between a deflated state or stowed state (FIGS. 4A and 5A) and a deployed or at least partially inflated state (FIGS. 4B and 5B). The inflatable member 38 initiates pivotable motion of the sub-frame member 26 and/or the carrier 30 about an axis 62 defined by the bracket 46. In various examples, a biasing member may be provided that is coupled to the frame 22 and the sub-frame member 26 and provides a biasing force to return the sub-frame member 26 to a stowed position when the inflatable member 38 is deflated. The biasing member may be a spring, elastic, or any other suitable structure or material that provides a returning force to the sub-frame member 26 upon deflation of the inflatable member 38.

Referring again to FIG. 1, the frame 22 can be made of a rigid material that is substantially unyielding to external forces. The carrier 30 may be made of a semi-rigid material that provides a degree of compliance in response to external forces. The carrier 30 can include an upper thoracic region 66 and a lower lumbar region 70. The upper thoracic region 66 and the lower lumbar region 70 may each be provided with bolsters 74 arranged on lateral sides of the carrier 30. The bolsters 74 can aid in retention of an occupant of the vehicle seating assembly 10 during vehicle maneuvers. With the carrier 30 being made of a semi-rigid material, the bolsters 74, the upper thoracic region 66, and/or the lower lumbar region 70 may yield to external forces, which may be applied by the occupant of the vehicle seating assembly 10. For example, as vehicle maneuvers are performed, the weight of the occupant of the vehicle seating assembly 10 may be shifted in a lateral direction and thereby cause an increase in the external force experienced by the bolsters 74 of the carrier 30. Accordingly, in response to the increased external force experienced by the carrier 30 due to the shifting of the weight of the occupant during vehicle maneuvers, the bolsters 74 of the carrier 30 may give way or otherwise comply or deform temporarily. In various examples, a space may be provided between the interior surface 58 of the carrier 30, and the occupant-facing surface 42 of the frame 22 to allow the carrier 30 to temporarily deform in response to external forces. The upper thoracic region 66 and the lower lumbar region 70 of the seatback 18 are separately formed from one another. By separately forming the upper thoracic region 66 and the lower lumbar region 70 from one another, it is possible to provide the rotatable or pivotable actuation of the upper thoracic region 66 while maintaining the lower lumbar region 70 as fixedly coupled to the seatback 18. The upper thoracic region 66 is pivotable or rotatable about the axis 62 that is defined by the bracket 46, as indicated by arrow 78.

Figure 2:
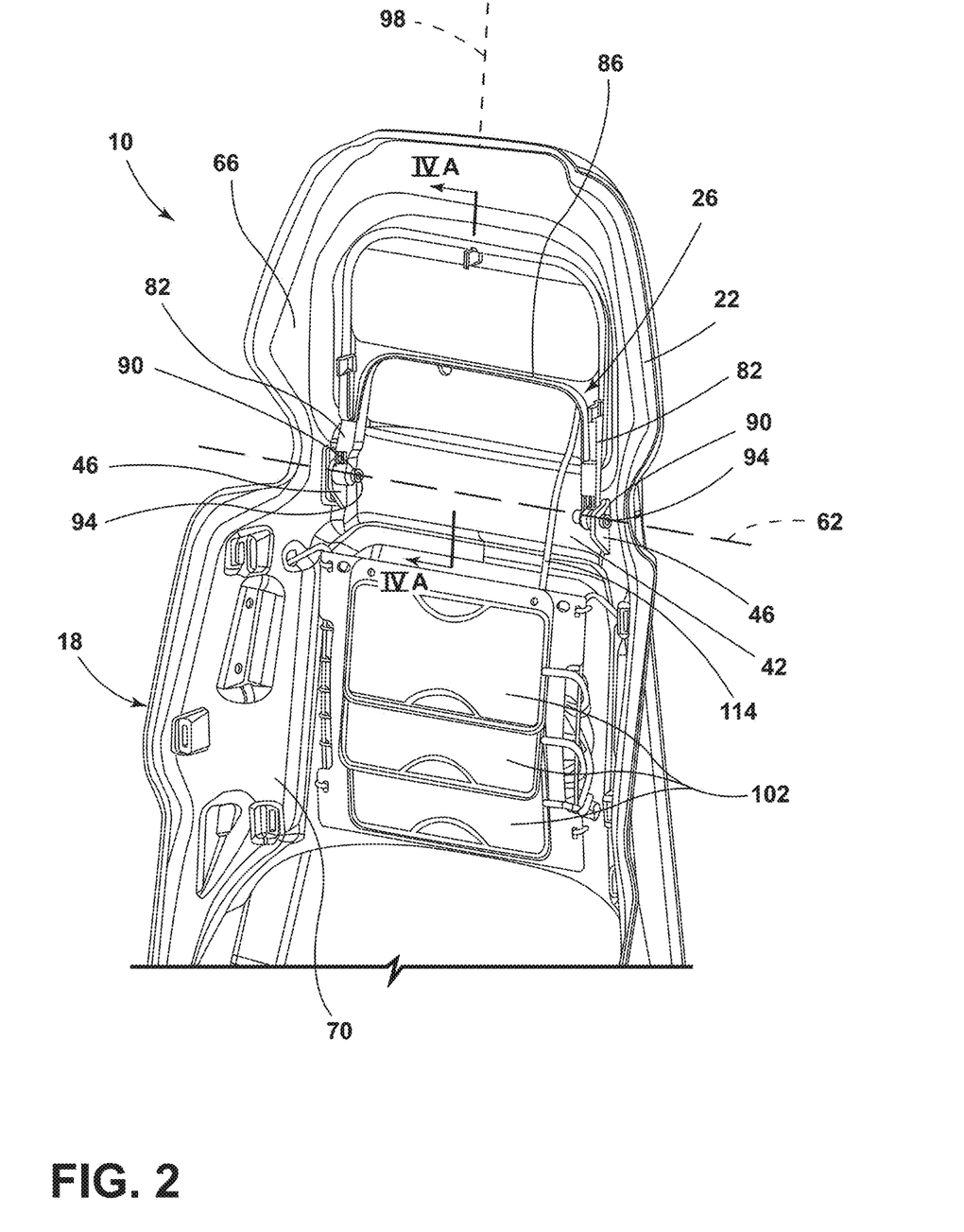
FIG. 2 is a front perspective view of the seatback with the carrier removed, illustrating a frame and a sub-frame member, according to one example.
Figure 3:
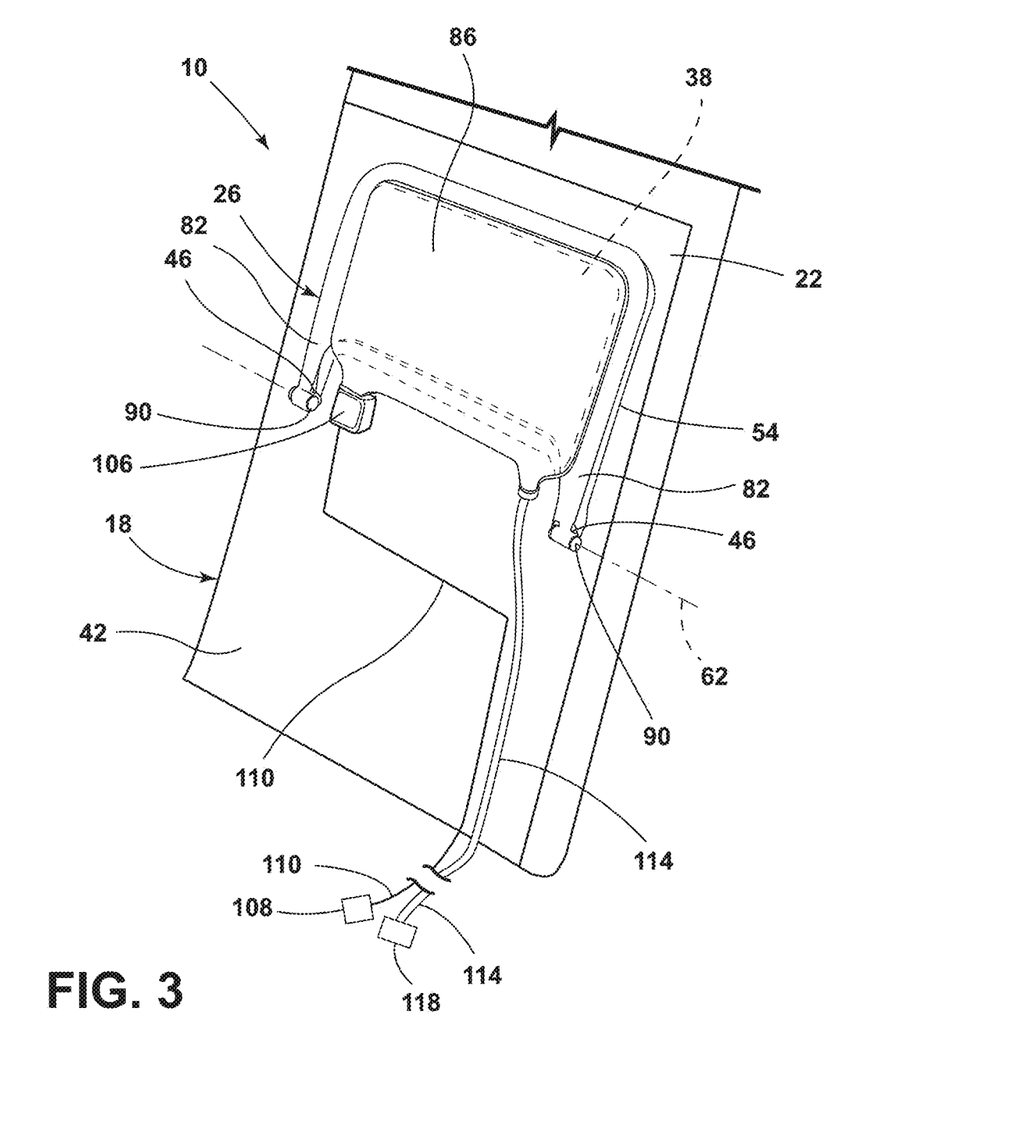
FIG. 3 is a front perspective and schematic representation of the frame, the sub-frame member, and an inflatable member, according to one example.

Referring now to FIGS. 2-3, the sub-frame member 26 may be generally U-shaped and can include an arm portion 82 that is interconnected by a connecting member 86. The arm portion 82 extend downward from the connecting member 86 to engage with the bracket 46 in a manner that permits pivotable or rotatable motion about the axis 62. The sub-frame member 26 is coupled to the bracket 46 by way of a retention member 90. The bracket 46 can be positioned on lateral sides of the frame 22 such that the arm portion 82 of the sub-frame member 26 each engage with one of the brackets 46. The retention member 90 is coupled to the bracket 46 and the arm portion 82 of the sub-frame member 26. Accordingly, the retention member 90 retains the sub-frame member 26 to the frame 22 by way of the bracket 46. In various examples, the retention member 90 may define an aperture 94. The aperture 94 that is defined by the retention member 90 can receive a fastener that couples the carrier 30 to the bracket 46, such that the carrier 30 is pivotable about the axis 62 that is defined by the bracket 46. In examples where the retention member 90 defines the aperture 94, the sub-frame member 26 may not be fully retained to the bracket 46 until such time that the fastener that couples the carrier 30 to the bracket 46 is inserted into the aperture 94. The fastener that is received within the aperture 94 of the retention member 90 may provide a degree of force that extends radially outward from a centerline of the aperture 94. Such that the retention member 90 experiences an expansive force provided by the insertion of the fastener and/or a compressive force experienced as a result of the retention member 90 being pressed against the bracket 46 due to the insertion of the fastener.

Referring again to FIGS. 2 and 3, the sub-frame member 26 may directly contact the occupant-facing surface 42 of the frame 22 when the inflatable member 38 is in the deflated state. Alternatively, in some examples, the sub-frame member 26 may be prevented from directly contacting the occupant-facing surface 42 of the frame 22 when the inflatable member 38 is in the deflated state in an effort to reduce noise that may result from the sub-frame member 26 bouncing or otherwise being jostled away from contact with the frame 22 as a result of vibrations associated with the operation of the vehicle. In such an example, the inflatable member 38 may provide a standoff function to prevent the sub-frame member 26 and the frame 22 from making direct physical contact in regions where the inflatable member 38 does not extend. The standoff function that may be provided by the inflatable member 38 can be provided by either slightly inflating the inflatable member 38, or by way of the thickness of the inflatable member 38 in the deflated state such that the sub-frame member 26 and the frame 22 are separated by a distance that is provided by a thickness of the inflatable member 38 when the inflatable member 38 is in the deflated state. In various examples, a position of the sub-frame member 26 may be adjusted independent of a rotational position of the seatback 18 relative to the seat 14. Said another way, in various examples, the inflatable member 38 may remain deflated throughout a rotational displacement of the seatback 18 relative to the seat 14, unless and until the occupant of the vehicle seating assembly 10 initiates inflation of the inflatable member 38 to adjust a rotational position of the sub-frame member 26 relative to the frame 22. It is contemplated that a controller or control module 108 may be utilized that associates a degree of inflation of the inflatable member 38 with a particular rotational displacement of the seatback 18 relative to the seat 14 based upon predetermined settings and/or assumptions regarding occupant comfort at the various rotational positions of the seatback 18 relative to the seat 14. In some examples, the inflatable member 38 positioned between the sub-frame member 26 and the frame 22 may include a plurality of the inflatable members 38. The plurality of inflatable members 38 may be arranged along a vertical axis 98 of the seatback 18, in a manner similar to those depicted in the lower lumbar region 70 and air bladders 102 of the seatback 18. The vehicle seating assembly 10 may be provided with a pressure gauge 106 that fluidly couples with the inflatable member 38. The pressure gauge 106 may be monitored by a control module 108. The control module 108 can be utilized to monitor a current pressure within the inflatable member 38 and may compare the current pressure with a list of predetermined pressures that are associated with various degrees of actuation of the sub-frame member 26 relative to the frame 22 as the sub-frame member 26 is actuated from a stowed position to a fully deployed position. The pressure gauge 106 may be coupled to the control module 108 by a conductive member 110 that extends between the pressure gauge 106 and the control module 108. A conduit 114 extends between the inflatable member 38 and an air supply 118.

Figure 4A:
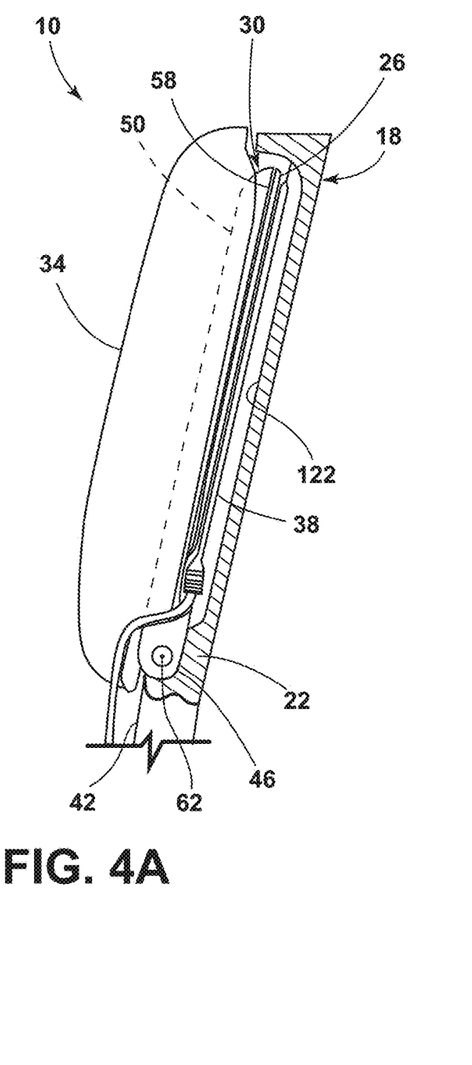
FIG. 4A is a cross-sectional view of the seatback, taken along line IVA-IVA of FIG. 2, illustrating the inflatable member in a deflated state, according to one example.
Figure 4B:
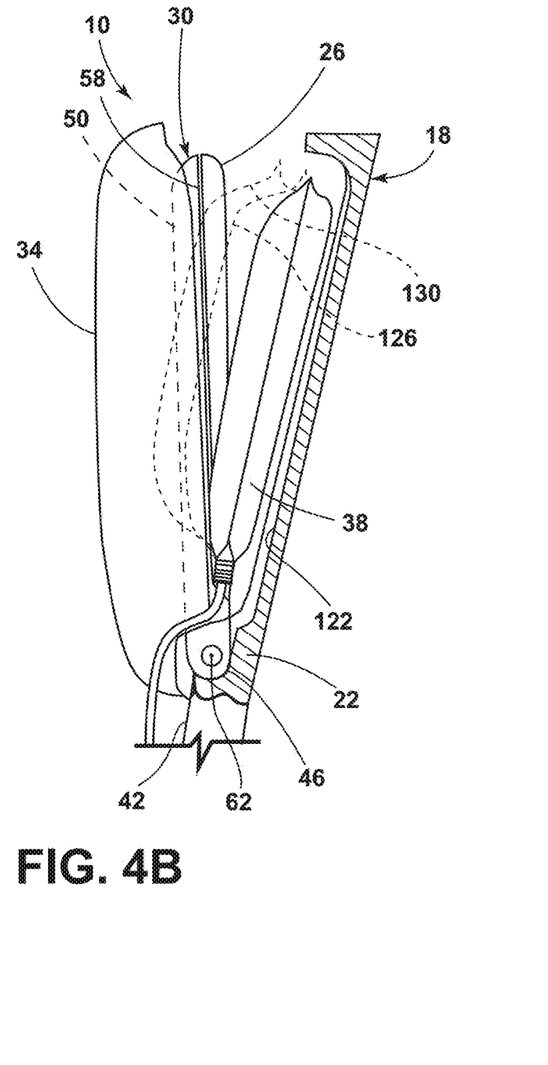
FIG. 4B is a cross-sectional view, taken along line IVA-IVA of FIG. 2, illustrating the inflatable member in an inflated state, according to one example.

Referring to FIGS. 4A and 4B, a surface area of contact between the inflatable member 38 and the interior surface 54 of the sub-frame member 26 may be greater when the inflatable member 38 is in the deflated state (FIG. 4A) than the surface area of contact between the inflatable member 38 and the interior surface 54 of the sub-frame member 26 when the inflatable member 38 is in the inflated state (FIG. 4B). The frame 22 of the seatback 18 may include a recess 122 that is defined by the frame 22. The inflatable member 38 can be positioned within the recess 122 of the frame 22. Such an arrangement may facilitate direct contact between the sub-frame member 26 and the occupant-facing surface 42 of the frame 22 when the inflatable member 38 is in the deflated state. For example, when the inflatable member 38 is in the deflated state and contained within the recess 122 of the frame 22, the interior surface 54 of the sub-frame member 26 and the occupant-facing surface 42 of the frame 22 may come into direct physical contact in regions of the sub-frame member 26 where the inflatable member 38 is not positioned between the sub-frame number 26 and the frame 22 (e.g., along a periphery or perimeter of the sub-frame member 26). As inflatable member 38 is transitioned from the deflated state (FIG. 4B) toward a fully-deployed inflated state (shown in phantom in FIG. 4B) the inflatable member 38 and ultimately the sub-frame member 26 and/or the carrier 30 move through a number of intermediate states. As shown in FIG. 4B, the inflatable member 38 is depicted in solid lines in one of these intermediate states. Additionally, the inflatable member 38 is shown at first phantom lines 126 in another intermediate state that represents a further inflated state from that which is depicted in solid lines. Further, the inflatable member 38 is depicted with second phantom line 130 in the fully-deployed inflated state. As the inflatable member 38 is transitioned from the deflated state toward the fully-deployed inflated state, the inflatable member 38 acts upon the occupant-facing surface 42 of the frame 22, which may be within the recess 122, as well as the interior surface 54 of the sub-frame member 26 or the interior surface 58 of the carrier 30. As the inflatable member 38 fills the space between the frame 22 and either the sub-frame member 26 or the carrier 30, the inflatable member 38 begins to act upon the sub-frame member 26 or the carrier 30 to affect rotational or pivotable motion about the axis 62, defined by the bracket 46. As the inflatable member 38 is inflated beyond the space available between the frame 22 and either the sub-frame member 26 or the carrier 30, the sub-frame member 26 or the carrier 30 are actuated to a greater extent about the axis 62 as a result of the further inflation of the inflatable member 38. In some examples, the interior surface 54 of the sub-frame member 26 may be provided with a recess that is defined by the sub-frame member 26. In such an example, the inflatable member 38 can be received by the recess defined by the sub-frame member 26 such that the inflatable member 38 is received between two recessed surfaces.

Figure 5A:
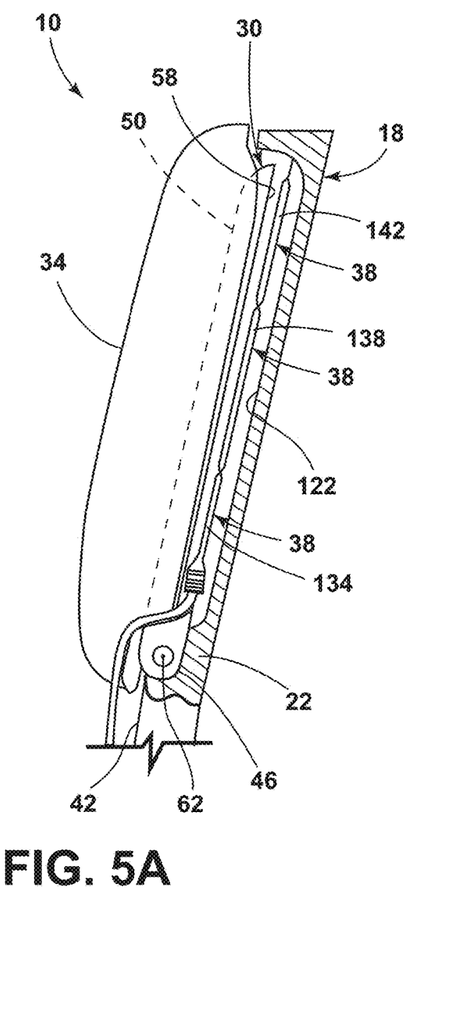
FIG. 5A is a cross-sectional view, taken along line IVA-IVA of FIG. 2, illustrating a plurality of the inflatable members each of which are in a deflated state, according to another example.
Figure 5B:
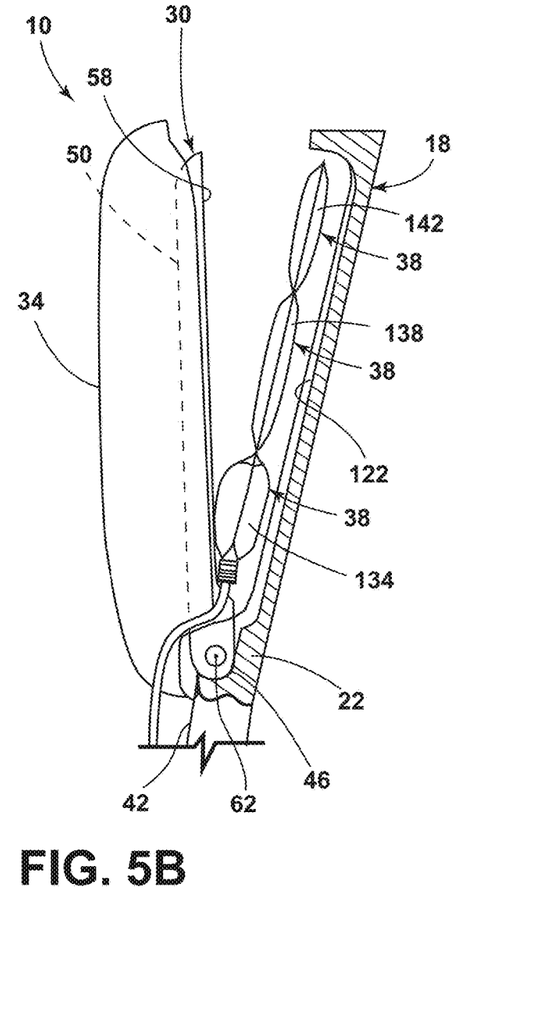
FIG. 5B is a cross-sectional view, taken along line IVA-IVA of FIG. 2, illustrating a plurality of the inflatable members, some of which are in an inflated state, according to another example.

Referring to FIGS. 5A and 5B, in some examples, rather than a single one of the inflatable members 38 being employed, a plurality of the inflatable members 38 may be utilized. The plurality of inflatable members 38 can be arranged along the vertical axis 98 of the seatback 18 (see FIG. 2). In such an example, the plurality of inflatable members 38 can be arranged along the vertical axis 98 such that the individual inflatable members 38 abut adjacent others of the individual inflatable members 38. For example, the plurality of inflatable members 38 can include a lower inflatable member 134, a middle inflatable member 138, and an upper inflatable member 142. An upper edge of the lower inflatable member 134 may be adjacent to or abut a lower edge of the middle inflatable member 138 and an upper edge of the middle inflatable member 138 may be adjacent to or abut a lower edge of the upper inflatable member 142. The inflatable member 38 that is positioned as the highest one of the inflatable members 138 along the vertical axis 98, such as the upper inflatable member 142, can be inflated to affect initial actuation of the sub-frame member 26 or the carrier 30 from the stowed position on its way to the fully deployed position. The lowest one of the inflatable members 38 along the vertical axis 98, such as the lower inflatable member 134, can be inflated to affect actuation of the sub-frame member 26 or the carrier 30 from an intermediate position to the fully deployed position. In various examples, the middle inflatable member 138 may be inflated to affect actuation of the sub-frame member 26 or the carrier 30 through a variety of intermediate positions between the stowed position and the fully deployed position. In various examples, the axis 62, defined by the bracket 46 is a fixed rotational axis relative to the seatback 18.

Figure 6:
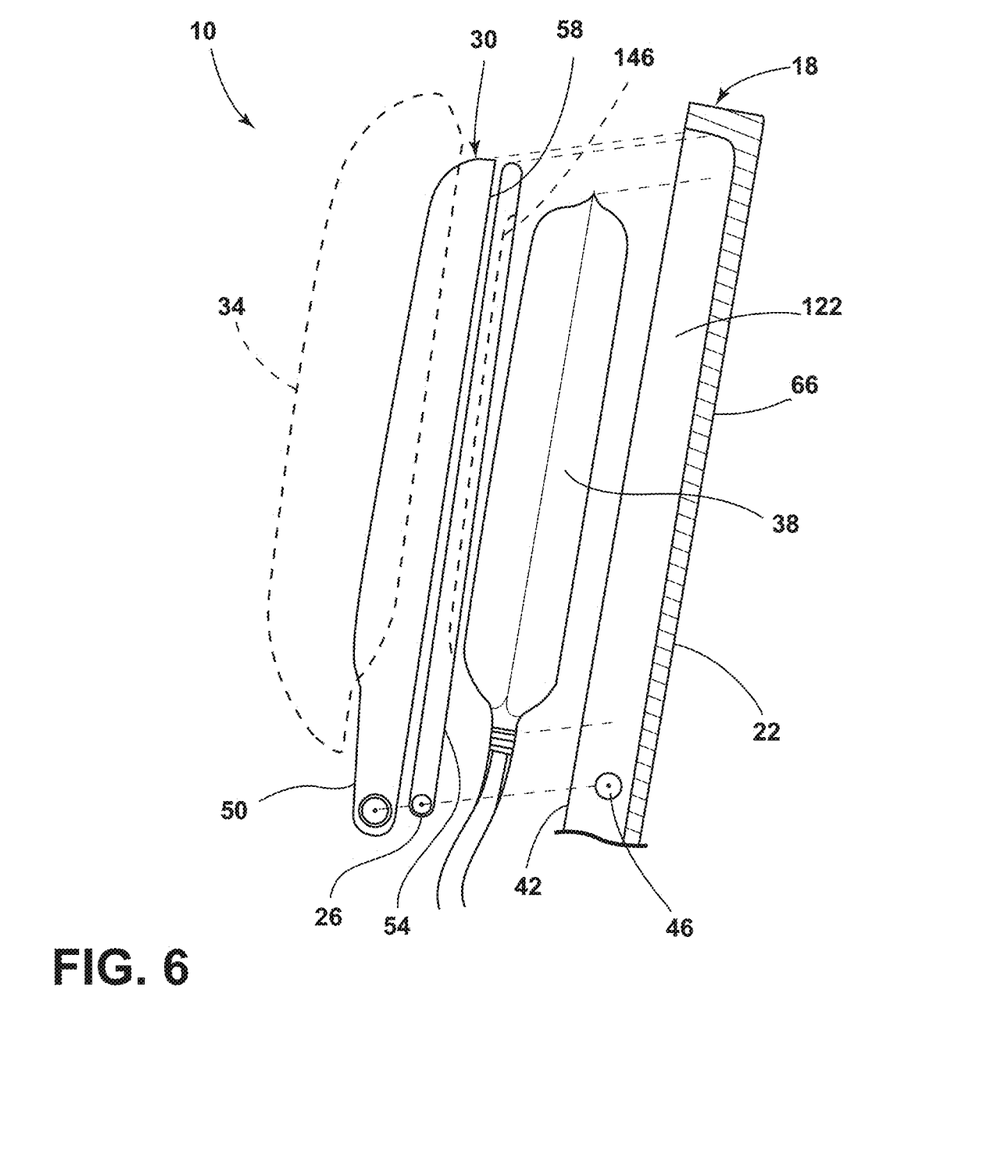
FIG. 6 is an exploded view of components of the seatback of the vehicle seating assembly, according to one example.

Referring now to FIG. 6, the upper thoracic region 66 of the seatback 18 is shown in an exploded view, according to one example. The cushion 34 engages with the occupant-facing surface 50 of the carrier 30, both of which are positioned forward of the sub-frame member 26 when the sub-frame member 26 is employed. The inflatable member 38 is positioned adjacent to the interior surface 54 of the sub-frame member 26 and adjacent to the occupant-facing surface 42 of the frame 22. In the depicted example, the inflatable member 38 is positioned between the two recessed surfaces of the recess 122 of the frame 22 and a recess 146 that can be defined by the interior surface 54 of the sub-frame member 26.

In various examples of the first aspect of the present disclosure, the carrier 30 may be pivotable about the axis 62 that is defined by the bracket 46. In some examples, the retention member 90 may be coupled to the bracket 46 and the arm portion 82 to retain the sub-frame member 26 to the frame 22. The retention member 90 that couples the bracket 46 and the arm portion 82 of the sub-frame member 26 can define the aperture 94 that receives a fastener, where the fastener couples the carrier 30 to the bracket 46 such that the carrier 30 is pivotable about the axis 62 that is defined by the bracket 46. In various examples, the sub-frame member 26 can directly contact the occupant-facing surface 42 of the frame 22 when the inflatable member 38 is in the deflated state. A position of the sub-frame member 26 can be adjustable independent of a rotational position of the seatback 18 relative to the seat 14. In various examples, a surface area of contact between the inflatable member 38 and the interior surface 54 of the sub-frame member 26 can be greater when the inflatable member 38 is in the deflated state than the surface area of contact between the inflatable member 38 and the interior surface 54 of the sub-frame member 26 when the inflatable member 38 is in the inflated state. In some examples, the frame 22 of the seatback 18 can include the recess 122 that is defined by the frame 22. The inflatable member 38 may be positioned within the recess 122 of the frame 22. In some examples, the interior surface 54 of the sub-frame member 26 can include the recess 146, which is defined by the sub-frame member 26. The inflatable member 38 may be received by the recess 146 defined by the sub-frame member 26 such that the inflatable member 38 may be received between two recessed surfaces (e.g., recess 122 and recess 146). In some examples, the inflatable member 38 can include a plurality of inflatable members 38, such as lower inflatable member 134, middle inflatable member 138 and/or upper inflatable member 142. In examples where the inflatable member 38 includes a plurality of inflatable members 38, it is contemplated that the plurality of inflatable members 38 may be interconnected by material and/or may be interconnected in a manner that permits fluid coupling between the plurality of inflatable members 38 such that air may be redistributed among the plurality of inflatable members 38. Alternatively, the examples where a plurality of the inflatable members 38 are employed may provide the inflatable members 38 as separate or discrete inflatable members 38. In examples that employ a plurality of the inflatable members 38, the inflatable members 38 may be arranged along the vertical axis 98 of the seatback 18. When the plurality of inflatable members 38 are arranged along the vertical axis 98, the plurality of inflatable members 38 can be positioned such that the individual inflatable members 38 that make up the plurality of inflatable members 38 abut adjacent others of the individual inflatable members 38. In various examples, a highest one of the inflatable members 38 along the vertical axis 98, such as upper inflatable member 142, may be inflated to effect initial actuation of the sub-frame member 26 from the stowed position. Some examples, a lowest one of the inflatable members 38 along the vertical axis 98, such as lower inflatable member 134, can be inflated to effect actuation of the sub-frame member 26 from an intermediate position to a fully-deployed position. In various examples, the pressure gauge 106 can be fluidly coupled to the inflatable member 38 and monitored by the control module 108. The axis 62 that is defined by the bracket 46 may be a fixed rotational axis. The inflatable member 38, the sub-frame member 26, the carrier 30, and the cushion 34 may each be positioned in the upper thoracic region 66 of the seatback 18.

According to examples of the second aspect, the frame 22 of the seatback 18 may include the recess 122 that is defined by the frame 22. In such an example, the inflatable member 38 may be positioned within the recess 122 of the frame 22. In some examples, the interior surface 54 of the sub-frame member 26 can include the recess 146 that is defined by the sub-frame member 26. In examples where the recess 122 and the recess 146 are both employed, the inflatable member 38 may be received by the recess 146 defined by the sub-frame member 26 such that the inflatable member 38 is received between two recessed surfaces (e.g., recess 122 and recess 146).

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
 a seat; and
 a seatback pivotably coupled to the seat, the seatback comprising:

a frame;
a sub-frame member comprising an arm portion, wherein the sub-frame member is pivotably coupled to an occupant-facing surface of the frame by a bracket;
a retention member that is coupled to the bracket and the arm portion of the sub-frame member to retain the sub-frame member to the frame, wherein the retention member that couples the bracket and the arm portion of the sub-frame member defines an aperture that receives a fastener, and wherein the fastener couples the carrier to the bracket such that the carrier is pivotable about the axis that is defined by the bracket;
a carrier coupled to the frame such that the sub-frame member is positioned between the frame and the carrier;
a cushion coupled to an occupant-facing surface of the carrier; and
an inflatable member positioned between the occupant-facing surface of the frame and an interior surface of the sub-frame member, the inflatable member being operable between a deflated state and an inflated state, and the inflatable member initiating pivotable motion of the sub-frame member about an axis defined by the bracket.

2. The vehicle seating assembly of claim 1, wherein the carrier is pivotable about the axis defined by the bracket.

3. The vehicle seating assembly of claim 1, wherein the sub-frame member directly contacts the occupant-facing surface of the frame when the inflatable member is in the deflated state.

4. The vehicle seating assembly of claim 1, wherein a position of the sub-frame member is adjustable independent of a rotational position of the seatback relative to the seat.

5. The vehicle seating assembly of claim 1, wherein a surface area of contact between the inflatable member and the interior surface of the sub-frame member is greater when the inflatable member is in the deflated state than the surface area of contact between the inflatable member and the interior surface of the sub-frame member when the inflatable member is in the inflated state.

6. The vehicle seating assembly of claim 1, wherein the frame of the seatback further comprises:
a recess defined by the frame, the inflatable member being positioned within the recess of the frame.

7. The vehicle seating assembly of claim 6, wherein the interior surface of the sub-frame member comprises:
a recess defined by the sub-frame member, the inflatable member being received by the recess defined by the sub-frame member such that the inflatable member is received between two recessed surfaces.

8. The vehicle seating assembly of claim 1, wherein the inflatable member comprises a plurality of inflatable members.

9. The vehicle seating assembly of claim 8, wherein the plurality of inflatable members are arranged along a vertical axis of the seatback.

10. The vehicle seating assembly of claim 9, wherein the plurality of inflatable members are arranged along the vertical axis such that the individual inflatable members that make up the plurality of inflatable members abut adjacent others of the individual inflatable members.

11. The vehicle seating assembly of claim 8, wherein a highest one of the inflatable members along the vertical axis is inflated to effect initial actuation of the sub-frame member from the stowed position.

12. The vehicle seating assembly of claim 11, wherein a lowest one of the inflatable members along the vertical axis is inflated to effect actuation of the sub-frame member from an intermediate position to the deployed position.

13. The vehicle seating assembly of claim 1, further comprising:
a pressure gauge fluidly coupled to the inflatable member and monitored by a control module.

14. The vehicle seating assembly of claim 1, wherein the axis defined by the bracket is a fixed rotational axis.

15. The vehicle seating assembly of claim 1, wherein the inflatable member, the sub-frame member, the carrier, and the cushion are positioned in an upper thoracic region of the seatback.

16. A vehicle seating assembly, comprising:
a seat; and
a seatback pivotably coupled to the seat, the seatback comprising:
a frame;
a sub-frame member pivotably coupled to an occupant-facing surface of the frame by a bracket, the bracket defining an axis about which the sub-frame member pivots;
a retention member that is coupled to the bracket and the sub-frame member, the retention member retaining the sub-frame member to the frame, the retention member defining an aperture;
a carrier coupled to the frame such that the sub-frame member is positioned between the frame and the carrier, the carrier being pivotable about the axis defined by the bracket;
a fastener received within the aperture defined by the retention member, the fastener coupling the carrier to the bracket such that the carrier is pivotable about the axis that is defined by the bracket;
a cushion coupled to an occupant-facing surface of the carrier; and
an inflatable member positioned between the occupant-facing surface of the frame and an interior surface of the sub-frame member, the inflatable member being operable between a deflated state and an inflated state, wherein the sub-frame member directly contacts the occupant-facing surface of the frame when the inflatable member is in the deflated state, wherein the inflatable member initiating pivotable motion of the sub-frame member about the axis defined by the bracket, wherein a surface area of contact between the inflatable member and the interior surface of the sub-frame member is greater when the inflatable member is in the deflated state than the surface area of contact between the inflatable member and the interior surface of the sub-frame member when the inflatable member is in the inflated state, and wherein the inflatable member, the sub-frame member, the carrier, and the cushion are positioned in an upper thoracic region of the seatback.

17. The vehicle seating assembly of claim 16, wherein the frame of the seatback further comprises:
a recess defined by the frame, the inflatable member being positioned within the recess of the frame.

18. The vehicle seating assembly of claim 17, wherein the interior surface of the sub-frame member comprises:
a recess defined by the sub-frame member, the inflatable member being received by the recess defined by the sub-frame member such that the inflatable member is received between two recessed surfaces.

19. A vehicle seating assembly, comprising:
a seat; and
a seatback pivotably coupled to the seat, the seatback comprising:
   a frame;
   a sub-frame member pivotably coupled to an occupant-facing surface of the frame by a bracket;
   a carrier coupled to the frame such that the sub-frame member is positioned between the frame and the carrier;
   a cushion coupled to an occupant-facing surface of the carrier;
   an inflatable member positioned between the occupant-facing surface of the frame and an interior surface of the sub-frame member, the inflatable member being operable between a deflated state and an inflated state, and the inflatable member initiating pivotable motion of the sub-frame member about an axis defined by the bracket; and
   a recess defined by the frame, the inflatable member being positioned within the recess of the frame.

20. The vehicle seating assembly of claim 19, wherein the interior surface of the sub-frame member comprises:
   a recess defined by the sub-frame member, the inflatable member being received by the recess defined by the sub-frame member such that the inflatable member is received between two recessed surfaces.

\* \* \* \* \*